Patented Sept. 7, 1937

2,092,322

UNITED STATES PATENT OFFICE 2,092,322

PROCESS FOR THE PRODUCTION OF ORGANIC PEROXIDES

Franz Rudolf Moser, Amsterdam, Netherlands, assignor to Shell Development Company, San Francisco, Calif., a corporation of Delaware No Drawing. Application March 18, 1935, Serial No. 11,667. In the Netherlands September 14, 1934

12 Claims. (Cl. 260—16)

This invention relates to processes of manufacturing organic peroxides and deals, particularly, with a novel, simplified method for economically producing peroxides from ketones, aldehydes, and the like. It is also concerned with the production of new compositions of matter comprising organic peroxides suitably "wetted" to reduce their explosiveness and make them capable of safe handling, transportation and storage.

The preparation of organic peroxides by the reaction of hydrogen peroxide upon ketones, aldehydes, dialkyl sulfates, acid anhydrides, acid chlorides and the like is well known. Particularly with ketones and aldehydes, the reaction has been carried out in the presence of strong acids, such as hydrochloric and sulfuric acids, while maintaining a low temperature. So-called dimeric acetone peroxide has also been prepared by reacting Caro's acid ($H_2SO_5$) with a solution of acetone in ether. All these prior procedures, involving as they do the separate preparation and addition of hydrogen peroxide or the relatively rare Caro's acid, are cumbersome and expensive.

It has now been found, and it is on this discovery that the present invention is based, that for the manufacture of organic peroxides, it is not necessary to resort to a separate operation of isolating hydrogen peroxide or of preparing Caro's acid, but that it is entirely feasible and less expensive, to use a solution of persulfuric acid or of a persulfate, the latter preferably acidified, as starting material.

The process of my invention comprises subjecting a solution of persulfuric acid or a, preferably acidified, solution of a persulfate to a hydrolytic treatment, such, for example, as bringing the solution to an elevated temperature for a short time. By this hydrolysis free hydrogen peroxide, and possible $H_2SO_5$ are formed in the solution. Without removing these hydrolysis products the at least partially hydrolyzed persulfate radical containing solution is reacted with the organic compound from which it is desired to manufacture the peroxide. This reaction is preferably carried out at a low temperature after which the peroxide formed is separated from the reaction mixture and the latter may again be used for the further preparation of peroxide. Although any conventional method may be used for recovering the peroxide from the reacted mixture, I prefer to make the separation by extraction with a suitable solvent which may then be incompletely removed from the peroxide leaving the latter "wetted" whereby its explosiveness is greatly reduced.

My invention may be practiced with any suitable organic compound which forms peroxides by reaction with hydrogen peroxide. Suitable organic compounds which may be used as starting material are, for example: aliphatic ketones, of which acetone, methyl ethyl ketone, diethyl ketone, methyl isopropyl ketone, methyl secondary butyl ketone, methyl tertiary butyl ketone are typical; aromatic ketones such as acetophenone, benzo-phenone, benzyl-ethyl ketone, benzylnaphthyl ketone, and homologues and analogues thereof; aliphatic aldehydes, such as formaldehyde, acetaldehyde, propionaldehyde, isobutylaldehyde, methyl ethyl acetaldehyde, trimethyl acetaldehyde, and the like; aromatic aldehydes, as benzaldehyde, toluic aldehydes, cuminol, naphthaldehyde, etc.; and aldehyde-ketone, including both aliphatic and aromatic compounds as pyroracemic aldehyde, isopropyl glyoxal, formyl acetone, laevulinic aldehyde, benzoyl-propia-aldehyde, and the like. Polyketonic and polyaldehydic compounds corresponding to the above may also be used, for example, diacetyl, acetyl propionyl, acetyl acetone, acetonyl acetyl acetone, glyoxal, succinic dialdehyde, mesoxalic dialdehyde, benzoyl-acetyl, phenyl - methyl - triketone. Furthermore, such compounds may contain substituents as halogen (as in chloral, monochloracetone and the like) nitro, i. e. $NO_2$, groups (as m-nitro benzaldehyde, etc.) and the like.

Such starting materials may be in the form of the chemical individuals, or mixtures thereof, or may be admixed with hydrocarbons or other materials which may be considered inert in the process. Thus the crude mixtures obtained in the preparation of such compounds, as, for example, the aldehyde and/or ketone containing mixtures resulting from the vapor phase oxidation of petroleum fractions, and the like, may be used.

The hydrolysis of the persulfuric acid solution may be carried out in any convenient manner. In place of persulfuric acid any soluble persulfate, such as sodium, potassium, calcium and the like persulfates, may be used, in which case a relatively strong acid is preferably added to the solution before hydrolysis. Short periods of heating at about 100° C. are usually sufficient to effect the desired hydrolysis. If desired, the hydrolysis may be carried out in the presence of the usual stabilizers for hydrogen peroxide such as urea and its derivatives, acetanilide, organic amido derivatives and the like. The hydrolysis treatment is a very important feature of my process as without it persulfuric acid solutions react only extremely slowly, if at all, with many of the organic compounds which readily form peroxides therewith, by my method. After the hydrolysis it may be desirable to add more acid to the mixture, as it is highly advantageous to maintain a condition of strong acidity during the subsequent reaction with the organic compound to be oxidized, as peroxide formation is considerably accelerated by the presence of free acid.

For the purpose of affording a clear understanding of my invention it will be described with more particular reference to the manufacture of acetone peroxide. It will be understood, however, that I am not to be limited thereto as this is only one example of the possible applications of a process which may be used to prepare a wide variety of other organic peroxides.

The reaction of acetone with a hydrolized persulfuric acid or persulfate solution, prepared as described above, is preferably carried out, as is also the case with the other starting materials given in the list of examples, below about zero degrees centigrade. The reagents may be contacted in any suitable manner, thus either batch, intermittent or continuous methods of operation may be used. One batch method of operation comprises adding the theoretical quantity of acetone in small doses to the strongly cooled persulfuric acid hydrolysis product while continually stirring the mixture. In general, only a short time is required for the reaction when the presence of free acid in the reaction mixture is assured as by the previously described method of persulfuric acid treatment.

The recovery of the organic peroxide may be carried out in any suitable conventional manner. Where a water insoluble solid peroxide such as acetone peroxide is being produced, it may be separated by filtration of the reaction mixture. Alternatively extraction methods may be used, suitable solvents being ether, gasoline, benzene, gas oil, and the like. The solvent employed should, preferably, be inert with respect to the reaction mixture which mainly contains sulfuric acid which can be used again for the preparation of more organic peroxide. Thus where a petroleum fraction is used, for example, it should be one which has been subjected to a thorough acid refining. Where the contemplated use of the organic peroxide demands a very pure product, as for example, in the bleaching of flour, and the like, volatile solvents such as gasoline or lower boiling hydrocarbon fractions, benzene and the like, which may readily be removed by distillation, may be used. On the other hand, the use of higher boiling extractants offers particular advantage where it is not necessary to apply the peroxide in such a high degree of purity. Thus, for instance, where the peroxide is to be used for improving the ignition quality of Diesel engine fuels, gas oil may very advantageously be used as the extractant. In such case it is unnecessary to recover the peroxide from the solvent since the extract representing, for example, a 7% peroxide solution may be directly blended with the fuel to be treated.

Such high boiling petroleum fractions may also be used to reduce the explosiveness of the peroxide, thus acetone peroxide wetted with gas oil, for example, is much more stable than the peroxide in a dry condition. Other hydrocarbons may be similarly used but because of their fire hazard highly volatile fractions are preferably avoided and those boiling above about 100° C. are given preference. To effect this stabilization of the peroxide only about 10 to 50% of wetting agent, based on the weight of the final product, need be used. The wetting agent may be added to the peroxide after its separation from the reaction mixture, or, as has already been mentioned, may be used as the extracting medium for the peroxide and then incompletely separated therefrom by vacuum distillation. In either case a thorough intimate dispersion of the wetting agent throughout the peroxide mass is highly desirable.

The following example illustrates in greater detail one method of preparing acetone peroxide by my invention:

A persulfuric acid solution containing about 13% $H_2S_2O_8$ which had been prepared by electrolysis of a 50% solution of sulfuric acid, was exposed for one minute at 100° C. to a hydrolytic treatment. It was then cooled to about −20° C. and its active oxygen content determined by analysis. The theoretical quantity of acetone corresponding to the active oxygen so determined was then added a little at a time while the mixture was stirred vigorously. On completion of the acetone addition, the mixture was allowed to react for an additional 15 minutes. The acetone peroxide formed was then extracted with benzene. The benzene was removed by evaporation on a water bath after which gas oil equivalent to about 40% of the weight of the acetone peroxide was added yielding a product which could be handled and stored with greatly reduced risk of explosion.

In addition to the use of these products as primers for Diesel engine fuels and as bleaching agents for flour, which have already been mentioned, they may also be employed as ignition aids for other types of motor fuels, such as gasolines, etc., and for other types of bleaching as in the bleaching of textiles, paper pulp, and the like. They are further useful as intermediates in the preparation of pharmaceuticals and other synthetic organic products, as well as oxidizing agents for promoting the drying of paint and varnish films, etc.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. A process of producing an organic peroxide which comprises reacting a member of the class consisting of ketones and aldehydes with a persulfate radical containing solution which has been subjected to a hydrolytic treatment.

2. A process of producing an organic peroxide which comprises reacting a member of the class consisting of ketones and aldehydes with a hydrolyzed persulfate solution.

3. A process of producing an organic peroxide which comprises reacting a member of the class consisting of ketones and aldehydes with a hydrolyzed persulfuric acid solution.

4. A process of producing a ketone peroxide which comprises reacting a ketone with a hydrolyzed persulfate radical containing solution.

5. A process of producing acetone peroxide which comprises reacting acetone with a persulfate radical containing solution which has been subjected to at least partial hydrolysis.

6. A process of producing an aldehyde peroxide which comprises reacting an aldehyde with an at least partially hydrolyzed persulfate radical containing solution.

7. A process of producing an organic peroxide which comprises hydrolyzing a persulfate radical containing solution, adding thereto a member of the class consisting of ketones and aldehydes and subsequently separating an organic peroxide therefrom.

8. A process of producing an organic peroxide which comprises reacting, in the presence of acid, a member of the class consisting of ketones and aldehydes with a hydrolyzed persulfate radical containing solution.

9. A process of producing an organic peroxide which comprises heating a persulfate radical containing solution, adding thereto a member of the class consisting of ketones and aldehydes and subsequently separating an organic peroxide therefrom.

10. A process of producing an organic peroxide which comprises reacting a member of the class consisting of ketones and aldehydes with a hydrolyzed persulfate radical containing solution at a temperature below about zero degrees centigrade.

11. A process of producing an organic peroxide which comprises reacting a member of the class consisting of ketones and aldehydes with an at least partially hydrolyzed persulfate radical containing solution in the presence of a hydrogen peroxide stabilizer.

12. A process of producing an organic peroxide which comprises reacting a member of the class consisting of ketones and aldehydes with a persulphate radical-containing solution which has been subjected to a hydrolytic treatment and subsequently separating an organic peroxide therefrom by extraction with a solvent for said peroxide which is also capable of behaving as a stabilizing agent therefor.

FRANZ RUDOLF MOSER.